(12) United States Patent
Brown et al.

(10) Patent No.: US 9,141,639 B2
(45) Date of Patent: *Sep. 22, 2015

(54) BITMAP SELECTION FOR REMOTE COPYING OF UPDATES

(71) Applicant: International Business Machines Corporation, Armonk, NY (US)

(72) Inventors: Theresa M. Brown, Tucson, AZ (US); Nedlaya Y. Francisco, Tucson, AZ (US); Theodore T. Harris, Jr., Tucson, AZ (US); Suguang Li, Tucson, AZ (US); Mark L. Lipets, Tucson, AZ (US); Carol S. Mellgren, Tucson, AZ (US); Raul E. Saba, Tucson, AZ (US); Alfred E. Sanchez, Tucson, AZ (US); Warren K. Stanley, Loveland, CO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/070,164

(22) Filed: Nov. 1, 2013

(65) Prior Publication Data

US 2014/0108756 A1    Apr. 17, 2014

Related U.S. Application Data

(63) Continuation of application No. 13/653,807, filed on Oct. 17, 2012.

(51) Int. Cl.
*G06F 11/00* (2006.01)
*G06F 17/30* (2006.01)

(Continued)

(52) U.S. Cl.
CPC .......... *G06F 17/30194* (2013.01); *G06F 3/065* (2013.01); *G06F 3/0619* (2013.01);
(Continued)

(58) Field of Classification Search
CPC ..... G06F 11/14; G06F 11/1446; G06F 11/16; G06F 11/2023; G06F 11/2033; G06F 11/2056; G06F 11/2064; G06F 11/2069; G06F 11/2082; G06F 11/2074
USPC .................. 714/6.1, 6.2, 6.22, 6.23; 711/114
See application file for complete search history.

(56) References Cited

U.S. PATENT DOCUMENTS 6,880,053 B2 *   4/2005   Kiselev et al. ................. 711/162
6,898,681 B2 *   5/2005   Young ............................ 711/162

(Continued)

OTHER PUBLICATIONS

Dufrasne, B., et al., "DS8000 Copy Services for IBM System z", IBM RedBooks, Chapter 1 and Part 4, Feb. 2009, 116 pp.

(Continued)

*Primary Examiner* — Alford Kindred
*Assistant Examiner* — Joseph Kudirka
(74) *Attorney, Agent, or Firm* — William K. Konrad; Konrad Raynes Davda & Victor LLP

(57) ABSTRACT

In one embodiment of the present description, a copy relationship is established between a storage location at a first site and a storage location at a second site in a data storage system, wherein a dynamically assignable bitmap preset to one of a plurality of different predetermined bit patterns is selected as a function of both the availability of the selected bitmap and the type of predetermined bit pattern identified for the selected bitmap. The selected bitmap may be assigned as an out-of-sync bitmap wherein updates to the storage location at one site, which are to be copied to the storage location at the other site, are indicated in the selected bitmap, and data writes being written to the storage location at the one site, are copied to the storage location at the other site, using the selected bitmap as an out-of-sync bitmap. Other aspects are described.

9 Claims, 7 Drawing Sheets

(51) Int. Cl.
*G06F 3/06* (2006.01)
*G06F 11/20* (2006.01)
*G06F 11/07* (2006.01)

(52) U.S. Cl.
CPC .......... *G06F3/0683* (2013.01); *G06F 11/2074* (2013.01); *G06F 11/004* (2013.01); *G06F 11/0751* (2013.01)

(56) References Cited

U.S. PATENT DOCUMENTS

| | | | |
|---|---|---|---|
| 7,085,902 B2 * | 8/2006 | Hayardeny et al. | 711/162 |
| 7,089,384 B2 * | 8/2006 | Tross et al. | 711/162 |
| 7,188,272 B2 * | 3/2007 | Bartfai et al. | 714/6.31 |
| 7,293,068 B2 * | 11/2007 | Katsuragi et al. | 709/217 |
| 7,386,664 B1 * | 6/2008 | Roy et al. | 711/114 |
| 7,412,464 B2 * | 8/2008 | Fienblit et al. | 1/1 |
| 7,603,581 B2 * | 10/2009 | Boyd et al. | 714/6.23 |
| 2006/0069893 A1 * | 3/2006 | LeCrone et al. | 711/167 |
| 2006/0156413 A1 | 7/2006 | Oh et al. | |
| 2009/0327601 A1 * | 12/2009 | Fienblit et al. | 711/114 |

OTHER PUBLICATIONS

Dufrasne, B., et al., "IBM System Storage DS8000: Copy Services in Open Environments", IBM RedBooks, Chapter 1 and Part 4, May 2008, 114 pp.
U.S. Appl. No. 13/653,807, filed Oct. 17, 2010.
Office Action dated Aug. 22, 2014, pp. 54, for U.S. Appl. No. 13/653,807, filed Oct. 17, 2012.
Response dated Nov. 22, 2014, pp. 12, to Office Action dated Aug. 22, 2014, pp. 54, for U.S. Appl. No. 13/653,807, filed Oct. 17, 2012.
Preliminary Amend dated Oct. 17, 2012, pp. 11, for U.S. Appl. No. 13/653,807, filed Oct. 17, 2012.
Final Office Action dated Jan. 2, 2015, pp. 23, for U.S. Appl. No. 14/070,164, filed Oct. 17, 2012.
Response dated Mar. 2, 2015, pp. 10, to Final Office Action dated Jan. 2, 2015, pp. 23, for U.S. Appl. No. 14/070,164, filed Oct. 17, 2012.
Notice of Allowance dated Mar. 18, 2015, pp. 13, for U.S. Appl. No. 14/070,164, filed Oct. 17, 2012.

* cited by examiner

200

| BITMAP DATA STRUCTURE | | | | |
|---|---|---|---|---|
| BITMAP INDEX | TYPE | FUNCTION | PRESET | Clean/Dirty |
| BI_01 | Static | Function A | Func. A Preset | Clean |
| BI_02 | Dynamic | | All zero's | Clean |
| BI_03 | Static | Function B | Func. B Preset | Clean |
| BI_04 | Dynamic | | All one's | Clean |
| BI_13 | Static | Function C | Func. C Preset | Clean |
| BI_14 | Dynamic | | All zero's | Clean |
| BI_15 | Static | Function D | Func. D Preset | Clean |
| BI_16 | Dynamic | | All one's | Clean |

| BITMAP DATA STRUCTURE | | | | |
|---|---|---|---|---|
| BITMAP INDEX | TYPE | FUNCTION | PRESET | Clean/Dirty |
| BI_01 | Static | Function A | Func. A Preset | Clean |
| BI_02 | Dynamic | Out-of-Sync | All zero's | Clean |
| BI_03 | Static | Function B | Func. B Preset | Clean |
| BI_04 | Dynamic | | All one's | Clean |
| BI_13 | Static | Function C | Func. C Preset | Clean |
| BI_14 | Dynamic | | All zero's | Clean |
| BI_15 | Static | Function D | Func. D Preset | Clean |
| BI_16 | Dynamic | | All one's | Clean |

FIG. 4B

BITMAP DATA STRUCTURE ⟵ 200

| BITMAP INDEX | TYPE | FUNCTION | PRESET | Clean/Dirty |
|---|---|---|---|---|
| BI_01 | Static | Function A | Func. A Preset | Clean |
| BI_02 | Dynamic | | All zero's | Clean |
| BI_03 | Static | Function B | Func. B Preset | Clean |
| BI_04 | Dynamic | Out-of-Sync | All one's | Clean |
| ⋮ | | | | |
| BI_13 | Static | Function C | Func. C Preset | Clean |
| BI_14 | Dynamic | | All zero's | Clean |
| BI_15 | Static | Function D | Func. D Preset | Clean |
| BI_16 | Dynamic | | All one's | Clean |

FIG. 4C

BITMAP SELECTION FOR REMOTE COPYING OF UPDATES

CROSS-REFERENCE TO RELATED APPLICATION

This application is a continuation of U.S. patent application Ser. No. 13/653,807, filed Oct. 17, 2012, which application is incorporated herein by reference in its entirety.

BACKGROUND OF THE INVENTION

1. Field of the Invention

The present invention relates to a method, system, and program for copying data between primary and secondary storage locations subject to a copy relationship.

2. Description of the Related Art

Data backup systems can provide continuous availability of production data in the event of a sudden catastrophic failure at a single point in time or data loss over a period of time. In one such system, production data is mirrored from a local site to a remote which may be separated geographically by several miles from the local site. Such dual, mirror or shadow copies are typically made in a secondary storage device at the remote site, as the application system is writing new data to a primary storage device usually located at the local site. Different copy technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

In data mirroring systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship. Primary and secondary storage controllers may be used to control access to the primary and secondary storage devices.

Geographically Dispersed Parallel Sysplex (GDPS) is an example of an application that customers may use to manage planned and unplanned outages. The GDPS application can detect failures at the primary storage system which may be at a local site, for example. Such failures may include a problem writing or accessing primary storage volumes at the local site. When the GDPS recovery application detects that a failure has occurred, it can invoke a swapping function referred to as the "HyperSwap" function. This function may be used to swap processing for all volumes in the mirrored configuration from the local site to the remote site. As a consequence of the swap, the storage volumes at the remote site which were originally configured as the secondary volumes of the original copy relationship, are reconfigured as the primary volumes of a new copy relationship. Similarly, the storage volumes at the local site which were originally configured as the primary volumes of the original copy relationship, may be reconfigured as the secondary volumes of the new copy relationship, once the volumes at the local site are operational again.

In connection with the swapping function, a failover function may be invoked. In the GDPS recovery application, the failover function can in some instances, obviate performing a full copy when re-establishing data replication in the opposite direction, that is, from the remote site back to the local site. More specifically, the failover processing resets or reconfigures the remote storage devices (which were originally configured as the secondary storage devices) to be the primary storage devices which are placed in a "suspended" status pending resumption of the mirroring operation but in the opposite direction. In the meantime, the failover processing starts change recording for any subsequent data updates made by the host to the remote site.

Once the local site is operational, failback processing may be invoked to reset the storage devices at the local site (which were originally configured as the primary storage devices) to be the secondary storage devices. Mirroring may then be resumed (but in the opposite direction, that is remote to local rather than local to remote) to resynchronize the secondary storage devices (originally the primary storage devices) at the local site to the data updates being stored at the primary storage devices (originally the secondary storage devices) at the remote site.

Copy services such as PPRC and data recovery programs which use copy services such as PPRC, frequently use various types of bitmaps stored in metadata. For example, bitmaps may be "static" bitmaps which are reserved for a particular function. Other bitmaps, often referred to as "dynamic" bitmaps, may be available for use by different functions and thus may be dynamically assigned to a function requesting a bitmap.

In general, the contents of static bitmaps are not known until they are initialized by the function reserved for that static bitmap. Dynamic bitmaps available for use by different functions, are typically initialized when created so that all bits of the bitmaps are initialized to a zero value. Once a function has completed use of a bitmap, the bitmap is considered to be "dirty" and thus is typically reinitialized (cleaned) before being used again.

The static and dynamic bitmaps are typically set up at the time the volumes are created. When a function requires a dynamic bitmap, it is assigned a bitmap index to an available dynamic bitmap. The value of this index which identifies the dynamic bitmap being assigned to the function, is typically kept in separate metadata until the bitmap is no longer in use.

In known copy services such as PPRC, an out-of-synch (OOS) bitmap is an example of a static bitmap reserved for the OOS function. An OOS bitmap includes a bit for each track of a primary storage location that storage controllers are to copy over to a corresponding track of a secondary storage location of a copy relationship. Thus, the out-of-synch bitmap indicates a backlog of tracks waiting to be copied. During normal copy operations, any writes to a storage controller for the primary storage location, are recorded in the out-of-synch bitmap (OOS) and then copied over to the secondary storage location.

Previously, processing of the swapping operation of failover commands such as the PPRC Failover command typically included initialization of the Out-Of-Sync (OOS) bitmap for all original remote volumes being reconfigured as primary volumes for the replacement copy relationship. The OOS bitmap is frequently stored as a data structure in metadata within the primary storage locations of the copy relationship. In a typical OOS bitmap, a zero bit indicates that no update has occurred for the data track of the primary storage location represented by that bit of the OOS bitmap. Hence, in many prior data recovery programs, the OOS bitmap is typically initialized to all zeros by accessing the metadata of the primary storage location and writing zeros to every bit position of the bitmap.

SUMMARY

Provided are a method, system, and program for remote copying of updates to primary and secondary storage locations subject to a copy relationship. In one embodiment of the present description, a copy relationship is established between a storage location at a first site and a storage location at a second site in a data storage system, wherein a dynamically assignable bitmap preset to one of a plurality of different predetermined bit patterns is selected as a function of both the availability of the selected bitmap and the type of predetermined bit pattern identified for the selected bitmap. The selected bitmap may be assigned as an out-of-sync bitmap wherein updates to the storage location at one site, which are to be copied to the storage location at the other site, are indicated in the selected bitmap, and data writes being written to the storage location at the one site, are copied to the storage location at the other site, using the selected bitmap as an out-of-sync bitmap.

In another embodiment, the copy relationship may be established in response to an establish command. In yet another embodiment, the copy relationship may be established in response to a failure detection.

In one embodiment, the copy relationship is a mirror relationship, and the storage locations at the first and second sites are initially in a first mirror relationship in which the storage location of the first mirror relationship at the first site is a primary storage location of the first mirror relationship, and the storage location of the first mirror relationship at the second site is the secondary storage location of the first mirror relationship, such that in the first mirror relationship, updates to the primary storage location at the first site are mirrored to the secondary storage location at the second site. In addition, in response to a failure detection, the primary and secondary storage location designations of the first and second sites are swapped to a second mirror relationship in which the storage location of the second mirror relationship at the second site is a primary storage location of the second mirror relationship, and the storage location of the second mirror relationship at the first site is the secondary storage location of the second mirror relationship, such that in the second mirror relationship, updates to the primary storage location at the second site are mirrored to the secondary storage location at the first site.

In another embodiment, a determination is made as to whether a failover parameter has been set in a received establish command, and a dynamically assignable bitmap preset to a first predetermined bit pattern is selected if it is determined that a failover parameter has been set in the received establish command.

In still another embodiment, a determination is made as to whether a copy all parameter has been set in a received establish command, and a dynamically assignable bitmap preset to a second predetermined bit pattern different from the first predetermined bit pattern, is selected if it is determined that a copy all parameter has been set in the received establish command. In one embodiment, the first predetermined bit pattern is all zeros and the second predetermined bit pattern is all ones.

In another embodiment, a data structure identifying a plurality of dynamically assignable bitmaps available to be assigned and identifying the type of predetermined bit pattern of each of the plurality of available dynamically assignable bitmaps, is read, and a dynamically assignable bitmap is selected as a function of both the availability of the selected bitmap as identified by the data structure, and the type of predetermined bit pattern as identified by the data structure.

In one embodiment, the selected bitmap is assigned as an out-of-sync bitmap and a data structure is updated to indicate that the selected bitmap is in use and is therefore no longer available. In yet another embodiment, the copy relationship is established in response to receipt of an establish command, and the dynamically assignable bitmap preset to a predetermined bit pattern, is selected as a function of a parameter of the received establish command.

Other embodiments, aspects and features are described herein.

BRIEF DESCRIPTION OF THE DRAWINGS

FIG. 4a-4c illustrate a chart depicting examples of metadata stored and updated in establishing the mirror or other copy relationship of FIG. 3.

DETAILED DESCRIPTION

Figure 1:
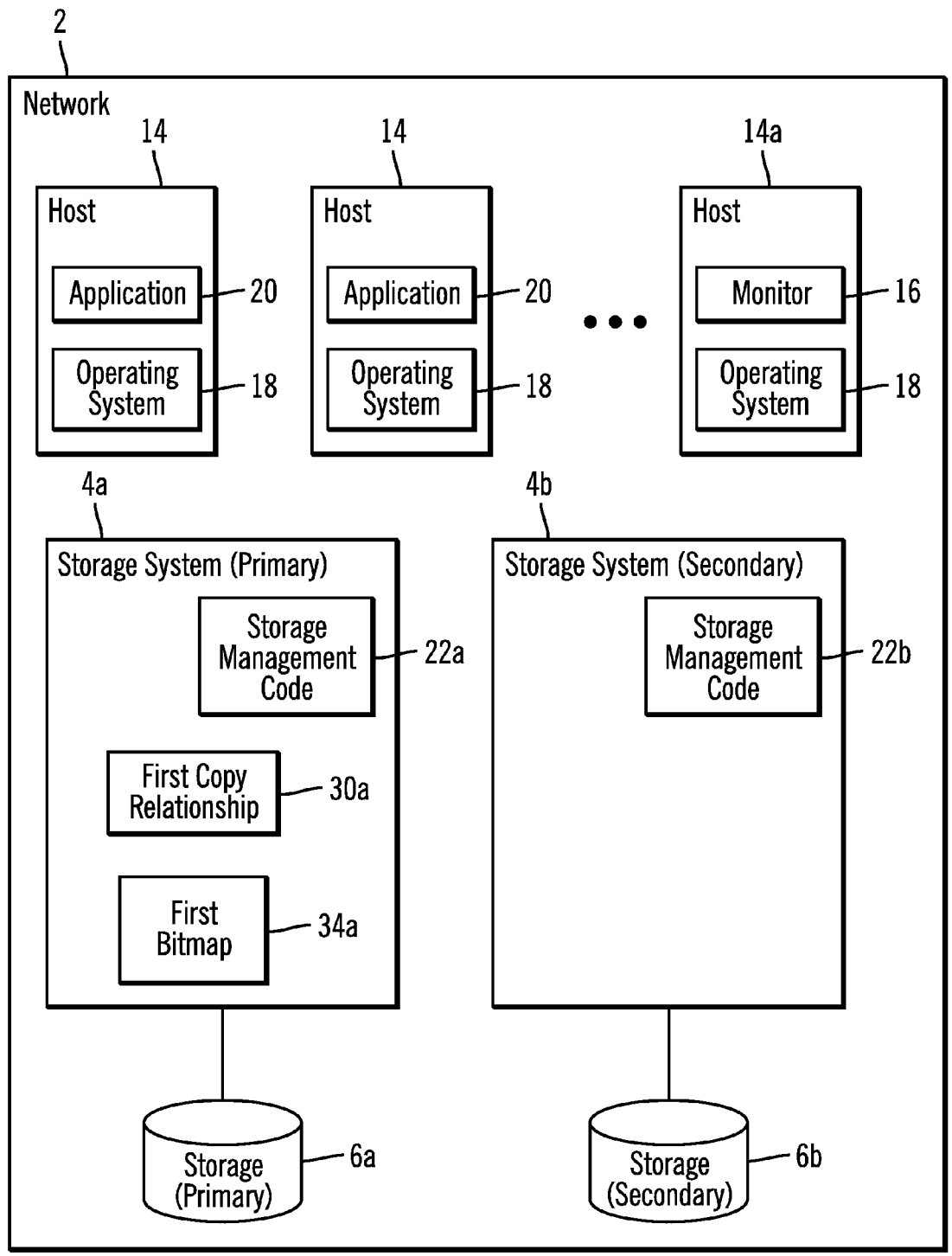
FIG. 1 illustrates an example of a network computing environment, in accordance with one embodiment of the present description.

FIG. 1 illustrates an embodiment of a network computing environment having a mirror relationship between a storage location at one site and a storage location at another site in such a network computing environment or other data storage system. In one aspect of the present description, such a mirror relationship may be established in a manner which includes selecting a dynamically assignable bitmap which has been preset to one of a plurality of different predetermined bit patterns, for use as an out-of-sync bitmap for the mirror relationship being established. The selected bitmap is used in the mirror relationship to indicate the updates to the storage location at one site, that are to be mirrored to the storage location at the other site.

Such an arrangement is believed to facilitate establishing a mirror relationship in which selected portions of one data location are identified in a bitmap for copying to another data location. Although the embodiment of FIG. 1 is described in connection with a mirror relationship and an out-of-sync bitmap, it is believed that aspects of the present description are applicable to other types of copy relationships and other types of bitmaps, depending upon the particular application. Additional features are discussed in the present description. It is appreciated that other features may be realized instead of or in addition to those discussed herein, depending upon the particular application.

In the illustrated embodiment, a copy relationship identifies a primary storage location and a secondary storage location in which data stored at the primary storage location is to be mirrored or otherwise copied to the secondary storage location. Thus, as used herein, a primary storage location and a secondary storage location are storage locations related by a copy relationship.

Furthermore, as used herein, the term "storage location" refers to a storage location containing one or more units of data storage such as one or more volumes, cylinders, tracks, segments or any portion thereof, or other unit or units of data suitable for transfer. Thus, a primary storage location and the secondary storage location may each be a storage volume, wherein the volumes are typically at different sites. However, it is appreciated that a primary storage location and a secondary storage location may each be of a size other than a volume, for example.

In the illustrated embodiment, an out-of-synch bitmap includes a bit for each track of a primary storage location that storage controllers are to copy over to a corresponding secondary storage location of a copy relationship. Thus, the out-of-synch bitmap indicates a backlog of tracks waiting to be copied. During normal copy operations, any writes to a storage controller for the primary storage location are recorded in the out-of-synch bitmap (OOS) and then copied over to the secondary storage location. Although the bitmaps of the illustrated embodiment are described as representing a track with a bit, it is appreciated that one or more bits of a bitmap may represent other data portions or segments such as one or more blocks, pages, bytes, sectors, etc as well as a plurality of tracks.

In the illustrated embodiment, a network 2 includes storage systems 4a, 4b, (also known as control units or storage controllers), and data storages 6a, 6b. The storage systems 4a, 4b, manage the copying of updates from a primary storage system to a secondary storage system. In the configuration illustrated in FIG. 1, the storage system 4a and the data storage 6a have been configured as a primary storage system and the primary storage, respectively. Similarly, the storage system 4b and its data storage 6b have been configured as a secondary storage system and a secondary storage, respectively. Hence, in the configuration depicted in FIG. 1, the storage system 4a will be referred to as a primary storage system 4a and the data storage 6a will be referred to as a primary storage 6a. Similarly, the storage system 4b will be referred to as a secondary storage system 4b and the data storage 6b will be referred to as a secondary data storage 6b. As explained in greater detail below, the storage systems and storages may be reconfigured to change the associated primary and secondary roles within a copy relationship.

The network 2 further includes one or more hosts 14 writing updates to the primary storage 6a. At least one such host 14, such as the host 14a, has in this embodiment, a monitor program 16 monitoring failures in the availability of the primary storage system 4a. In some embodiments, the monitor program 16 may be operated in a device apart from the hosts. The components 4a, 4b, 6a, 6b, and 14 are connected to the network 2 and the network 2 enables communication among these components. The network 2 may include one or more switches to provide one or more paths of communication between the different network 2 elements.

The primary storage system 4a is located at a first site and the secondary storage system 4b is located at a second site which may be geographically or functionally remote from the first site. Thus, in this example, the first site may be at a local site and the second site may be at a geographically remote site separated by a short or long geographical distance from the local site. Alternatively, the local and remote sites may be relatively close such as in different buildings in the same general geographical location, in different rooms of the same building, in different machines in the same room, or in different portions or partitions of the same machine, of the network 2.

A typical host 14 includes an operating system 18 and an application 20 that writes updates to the primary 6a or secondary 6b storage. The host 14a which includes the monitor program 16 may omit the update writing applications 20 in some embodiments. The primary 4a and secondary 4b storage systems include storage management software 22a and 22b to manage the data mirroring operations.

A first copy relationship 30a, which may be maintained for the primary 4a and secondary 4b storage systems, associates primary storage locations in the primary storage 6a and corresponding secondary storage locations in the secondary storage 6b, such that updates to the primary storage 6a locations are copied to the corresponding secondary storage 6b locations. In some embodiments, the updates to the primary storage 6a locations may be copied to the corresponding secondary storage 6b locations before they are written to the primary storage 6a.

In the illustrated embodiment, the first copy relationship 30a comprises a peer-to-peer mirror relationship for a pair of storage locations in which updates to the primary storage locations of the mirror relationship 30a are mirrored to the secondary storage locations of the mirror relationship 30a. It is appreciated that other types of copy relationships may be established, depending upon the particular application.

In connection with the copy relationship 30a, updates to the primary storage locations of the primary storage 6a are indicated in a first bitmap 34a, which is an out-of-sync (OOS) bitmap in the illustrated embodiment. The OOS bitmap 34a is cleared as the storage management code 22a, 22b copies updates indicated in the OOS bitmap 34a to the corresponding storage locations of the secondary storage 6b of secondary storage system 4b.

The storage management software 22a accesses updates to the primary (first) 6a to write to the corresponding storage locations in the storage 6b. In some applications, the copying and relationship functions may be performed by devices external to the storage systems 4a, 4b, such as the hosts 14, for example.

The monitor program 16 may monitor the primary storage system 4a and upon detecting a failure event, may cause a failover operation to cause updates from the host 14 to be sent to the secondary storage system 4b instead of to the primary storage system 4a. If the system fails while updates to the primary storage 6a are being applied to the storage 6b, then the updates that did not complete being mirrored to the storage 6b can be recovered and applied to the storage 6b.

The storage management code 22a, 22b is invoked to establish a copy relationship such as the first copy relationship 30a, between first and second storage locations in a first storage system and second storage system, respectively. The storage systems 4a, 4b may comprise enterprise storage servers, such as the IBM Enterprise Storage Server (ESS), for example.

The storage management code 22a, 22b managing the first copy relationship 30a may be implemented using synchronous copy operations, such as a peer-to-peer remote copy (PPRC) program. An example of a PPRC program is the IBM Geographically Dispersed Parallel Sysplex (GDPS)/PPRC copy program that enables the switching of updates to the primary storage 6a to the secondary storage 6b. The storage management code 22a, 22b, and 22c may also implement asynchronous remote copy operations. An example of an asynchronous remote copy program is the IBM GDPS/XRC program where updates to the primary 6a or secondary 6b storage are mirrored to a corresponding location in at a remote site. The described operations may be implemented with other programs such as other copy programs or other global recovery programs.

The network 2 may comprise a Storage Area Network (SAN), Local Area Network (LAN), Intranet, the Internet, Wide Area Network (WAN), peer-to-peer network, wireless network, arbitrated loop network, etc. The storages 6a, 6b may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 2:
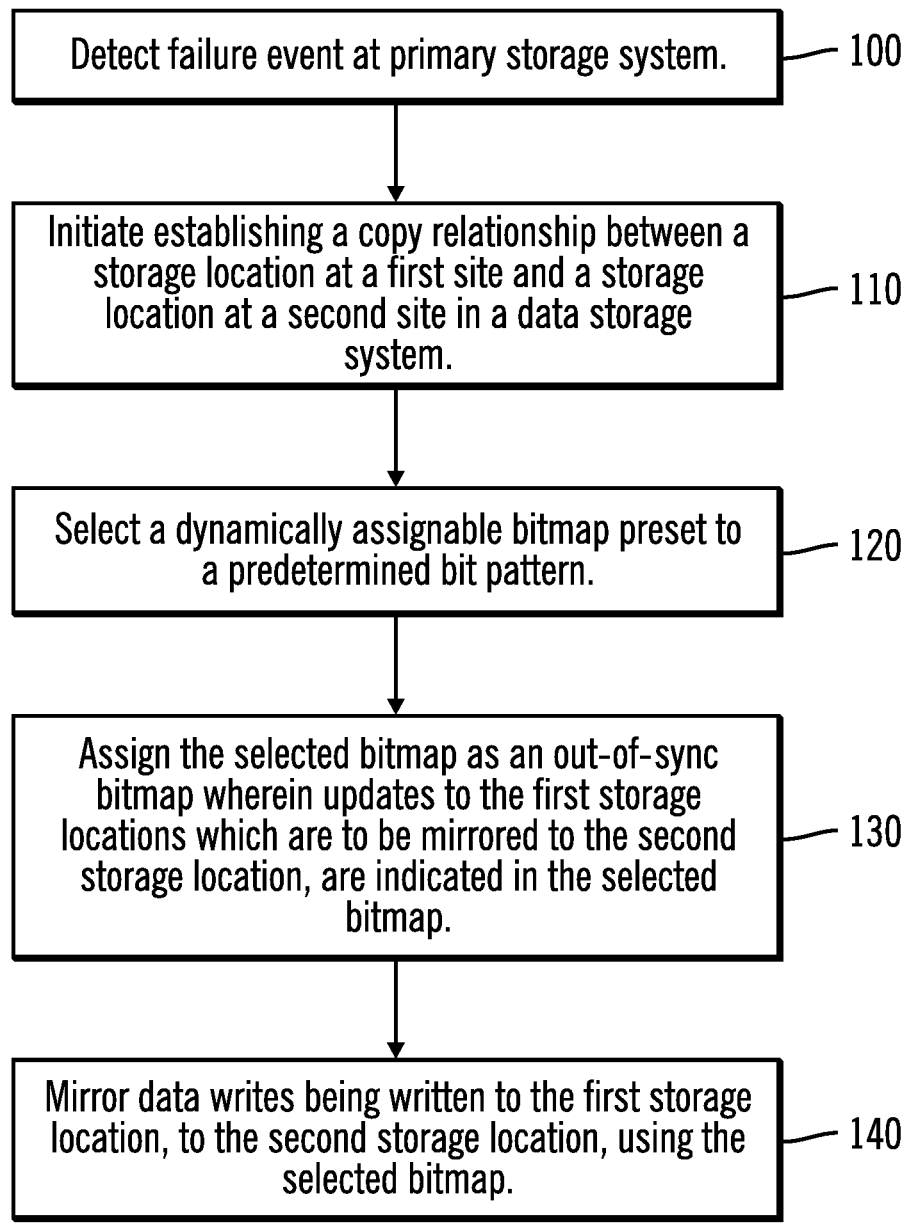
FIG. 2 illustrates an embodiment of operations to select a dynamically assignable bitmap which has been preset to one of a plurality of different predetermined bit patterns, for use as an out-of-sync bitmap for a mirror or other copy relationship being established.

FIG. 2 illustrates one example of operations of a networked storage system in accordance with one embodiment of the present description. In a first operation, a failure event at a primary storage system is detected (block 100). The error event may comprise for example, a failure of the primary storage system 4a or a failure in the network 2 connection at the primary storage system 4a. Thus, a failure at the primary storage system 4a is detected (at block 100). The failure may be detected by the monitor component 16 for example.

In the example of FIG. 2 an error event at the primary storage system 4a is handled by creating a replacement copy relationship in which the primary storage locations of the failed or failing copy relationship are swapped to a different storage system such as the secondary storage system 4b. Thus, in response to the failure detection (block 100) of the primary storage system of a first copy relationship, the establishment of a second copy relationship 30b (FIG. 3) is initiated (block 110, FIG. 2) to at least temporarily replace the first copy relationship 30a (FIG. 1).

As previously mentioned, Geographically Dispersed Parallel Sysplex (GDPS) is an example of a recovery application that customers may use to manage planned and unplanned outages. The GDPS recovery application can detect failures at the primary storage system which may be at a local site, for example. Such failures may include a problem writing or accessing the primary storage volumes at the local site. When the GDPS recovery application detects that a failure has occurred, it can invoke a swapping function referred to as the "HyperSwap" function. This function may be used to swap processing for all volumes in the mirrored configuration from the local site to the remote site. As a consequence of the swap, the storage volumes at the remote site which were originally configured as the secondary volumes of the original copy relationship, are reconfigured as the primary volumes of a new copy relationship. Similarly, the storage volumes at the local site which were originally configured as the primary volumes of the original copy relationship, are reconfigured as the secondary volumes of the new copy relationship, once the volumes at the local site are operational again.

In connection with the swapping function, a failover function may be invoked. In the GDPS recovery application, the failover function can in some instances, obviate performing a full copy when re-establishing data replication in the opposite direction, that is, from the remote site back to the local site. More specifically, the failover processing resets or reconfigures the remote storage devices (which were originally configured as the secondary storage devices) to be the primary storage devices which are placed in a "suspended" status pending resumption of the mirroring operation but in the opposite direction. In the meantime, the failover processing starts change recording for any subsequent data updates made by the host to the remote site.

Once the local site is operational, failback processing may be invoked to reset the storage devices at the local site (which were originally configured as the primary storage devices) to be the secondary storage devices. Mirroring may then be resumed (in the opposite direction, that is remote to local rather than local to remote) to resynchronize the secondary storage devices (originally the primary storage devices) at the local site to the data updates being stored at the primary storage devices (originally the secondary storage devices) at the remote site.

Thus, in the illustrated embodiment, upon detecting the failure (block 100), a failover is issued for the first copy relationship 30a (or some other action performed) to cause the host 20 to write further updates to the secondary storage 6b instead of primary storage 6a. The monitor code 16 may communicate to the storage management code 22a, 22b that the primary storage system 4a has failed or that first copy relationship 30a is suspended. Alternatively, the storage management code 22a, 22b may learn of the failure of the primary storage system 4a (or suspension of the first copy relationship 30a) before receiving indication from the monitor code 16 of such failure. The storage management code 22a, 22b indicates the first copy relationship 30a as suspended in response to determining that the first storage system 4a has a failure (either independently of the communication from the monitor 16 or in response to the communication).

Figure 3:
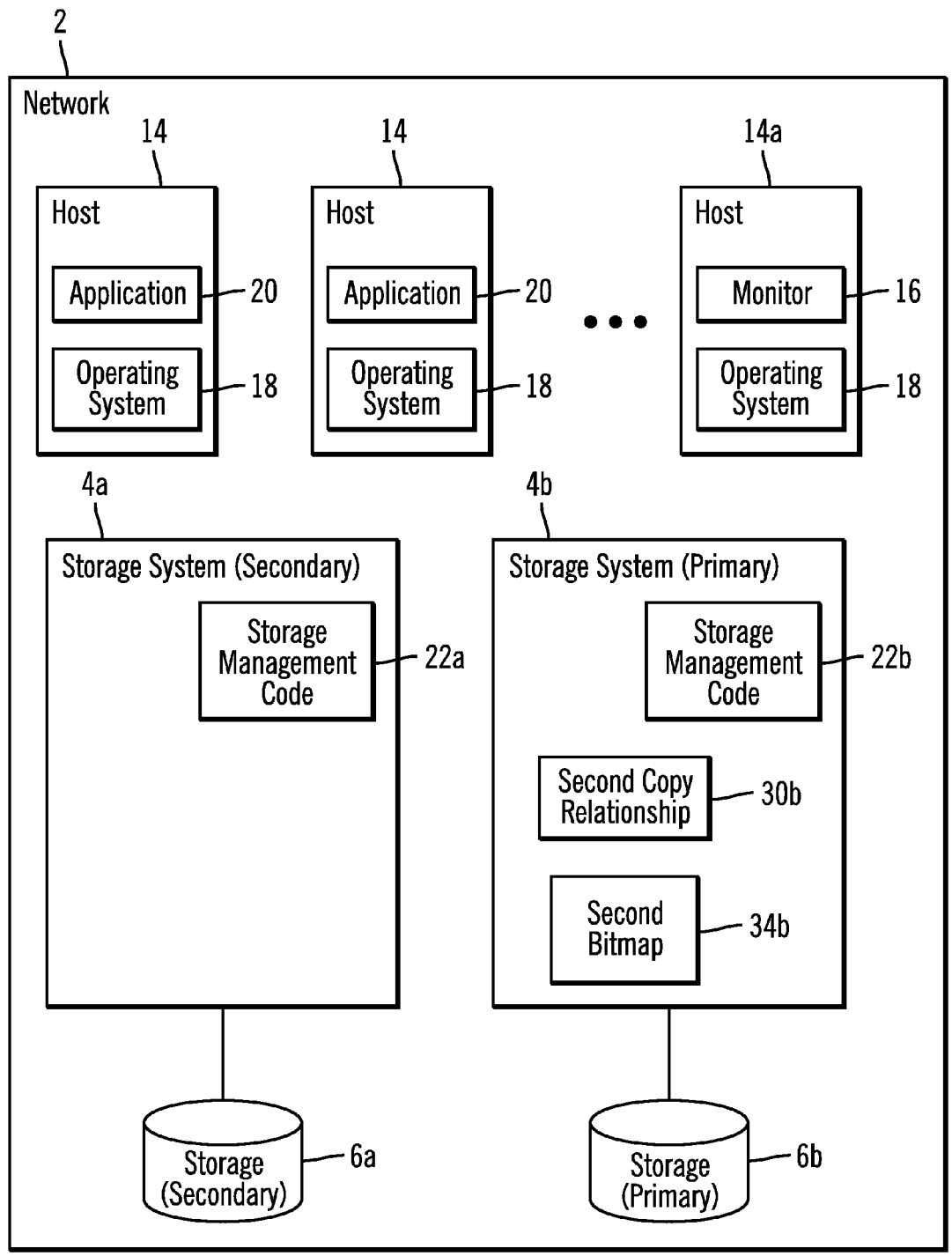
FIG. 3 illustrates the network computing environment of FIG. 1 having a second mirror or other copy relationship being established.

Accordingly, in the illustrated embodiment, in response to the failure detection (block 100) of the primary storage system of a first copy relationship, the establishment of a second copy relationship 30b (FIG. 3) is initiated (block 110, FIG. 2) in which the primary storage of the second copy relationship 30b is now the storage 6b (FIG. 3) at the remote site, and the secondary storage will be the storage 6a (FIG. 3) at the local site as indicated in FIG. 3. The second copy relationship 30b has a second bitmap 34b which is used by the second copy relationship 30b to record the updates to the storage locations of the primary storage 6b (FIG. 3) at the remote site, that are to be mirrored back to the storage locations of the secondary storage 6a (FIG. 3) at the local site, once the secondary storage system 4a and secondary storage 6a (FIG. 3) at the local site are operational again.

Previously, processing of the swapping operation of failover commands such as the PPRC Failover command typically included initialization of the Out-Of-Sync (OOS) bitmap for all original remote volumes being reconfigured as primary volumes for the replacement copy relationship. The OOS bitmap is frequently stored as a data structure in metadata within the primary storage locations of the copy relationship. In a typical OOS bitmap, a zero bit indicates that no update has occurred for the data portion of the primary storage location represented by that bit of the OOS bitmap. Hence, in many prior data recovery programs, the OOS bitmap is typically initialized to all zeros by accessing the metadata of the primary storage location and writing zeros to every bit position of the bitmap. As a result, the primary/secondary swapping operation of the failover operation may have taken an inconvenient length of time to complete, particularly if there are many volumes in the copy relations, or if the volumes are large, or if the metadata containing the OOS bitmap resides on slow ranks or drives of the primary storage locations.

For example, when a volume is created, tracks are typically allocated for metadata including data structures for bitmaps for copy services use. The number of these metadata tracks allocated for a particular primary storage volume will frequently depend on the size of the volume. For example, each track of bitmap metadata will often contain a portion of each of the different bitmaps used by the copy service. In some applications, there may be many different bitmaps to support in the metadata. For example, in one embodiment, there are 16 different bitmaps, however other embodiments may have more or fewer bitmaps, depending upon the particular application. Accordingly, sufficient tracks are allocated for the bitmap metadata to support all the different bitmaps, where each bitmap has one bit for each track of the primary storage location. In one implementation having 16 bitmaps, for example, each bitmap metadata track may have sufficient capacity to store data representing as many as 3360 primary storage location tracks for the 16 different bitmaps. Thus, in a volume having, for example, a total of 150255 primary storage location tracks for data storage by a customer, a total of 45 bitmap metadata tracks (150255/3360) may be allocated. Some primary data storage volumes are even larger. For example, a primary storage volume such as a 1 terabyte (TB) volume, for example, may have 1182006 cylinders, which provides 17730090 customer tracks. Thus, this larger primary storage volume may allocate 5277 bitmap metadata tracks (17730090/3360). As a result, to write all zeros to initialize all bit positions of an OOS bitmap for a 1 TB volume, all 5277 metadata tracks were staged and accessed. This can be time consuming especially in those situations where the host is not permitted access to the volumes during this phase.

Previously, the OOS bitmap used by a PPRC data recovery program, was a "static" bitmap which was reserved for use as the OOS bitmap function. In general, the contents of static bitmaps are not known until they are initialized by the function reserved for that static bitmap. Accordingly, in prior PPRC failover command processing, all the bits in the static bitmap reserved for the OOS bitmap function, were initialized to zero. For a 1 TB volume, for example, all 5277 metadata tracks were staged and modified as discussed above. This initialization of the OOS bitmap could be very time consuming.

In accordance with one aspect of the present description, instead of using a static bitmap reserved for the OOS function, a dynamically assignable bitmap preset to a predetermined bit pattern may be selected (block 120, FIG. 2). The selected dynamic bitmap may then be assigned (block 130) as an out-of-sync (OOS) bitmap wherein updates to one storage location, which are to be mirrored (block 140) to another storage location, are indicated in the selected bitmap.

FIG. 4a is a chart 200 depicting metadata which may be maintained for a set of bitmaps which may be used by copy services. In this embodiment, 16 bitmaps were created and each bitmap may be identified by an associated bitmap index BI_01-BI_16 as indicated in the chart 200. The bitmaps and associated metadata of chart 200 may be created when the associated storage volumes are created. Alternatively, the bitmaps and associated metadata of chart 200 may be created at a subsequent time in anticipation of or upon the need arising for a copy service function for the associated storage volumes.

In the example of FIG. 4a, the bitmaps include both static and dynamic bitmaps. Each of the static bitmaps is reserved for a particular copy service function. Thus, in the example of the chart 200, the static bitmaps identified by the bitmap indices BI_01, BI_03, BI_13, and BI_15, respectively, are reserved for copy service functions A, B, C and D, respectively. As static bitmaps, once called into use by the copy service function reserved for the particular static bitmap, the static bitmap will be initialized with a bit pattern appropriate for that particular function. Thus, when called into use, the static bitmap BI_01 will be initialized with the function A preset bit pattern, the static bitmap BI_03 will be initialized with the function B preset bit pattern, and so on.

When a copy service function requires a dynamic bitmap, it is assigned a bitmap index to an available dynamic bitmap. This index value may be kept in separate metadata associated with the calling copy service function until the dynamic bitmap is no longer in use by that function. In accordance with the present description when a copy service function calls for an OOS bitmap, rather than using a static bitmap for the OOS bitmap operation, a dynamic bitmap may be assigned from the available bit maps. In accordance with another aspect of the present description, the dynamic bitmaps may already be preset in one a plurality of different preset bit patterns. For example, in the illustrated embodiment, one preset bit pattern for some of the dynamic bitmaps is a bit pattern of all zeros. Conversely, in the illustrated embodiment, another preset bit pattern for other dynamic bitmaps is a bit pattern of all ones. Other bit pattern presets may be utilized, depending upon the particular application.

Figure 5:
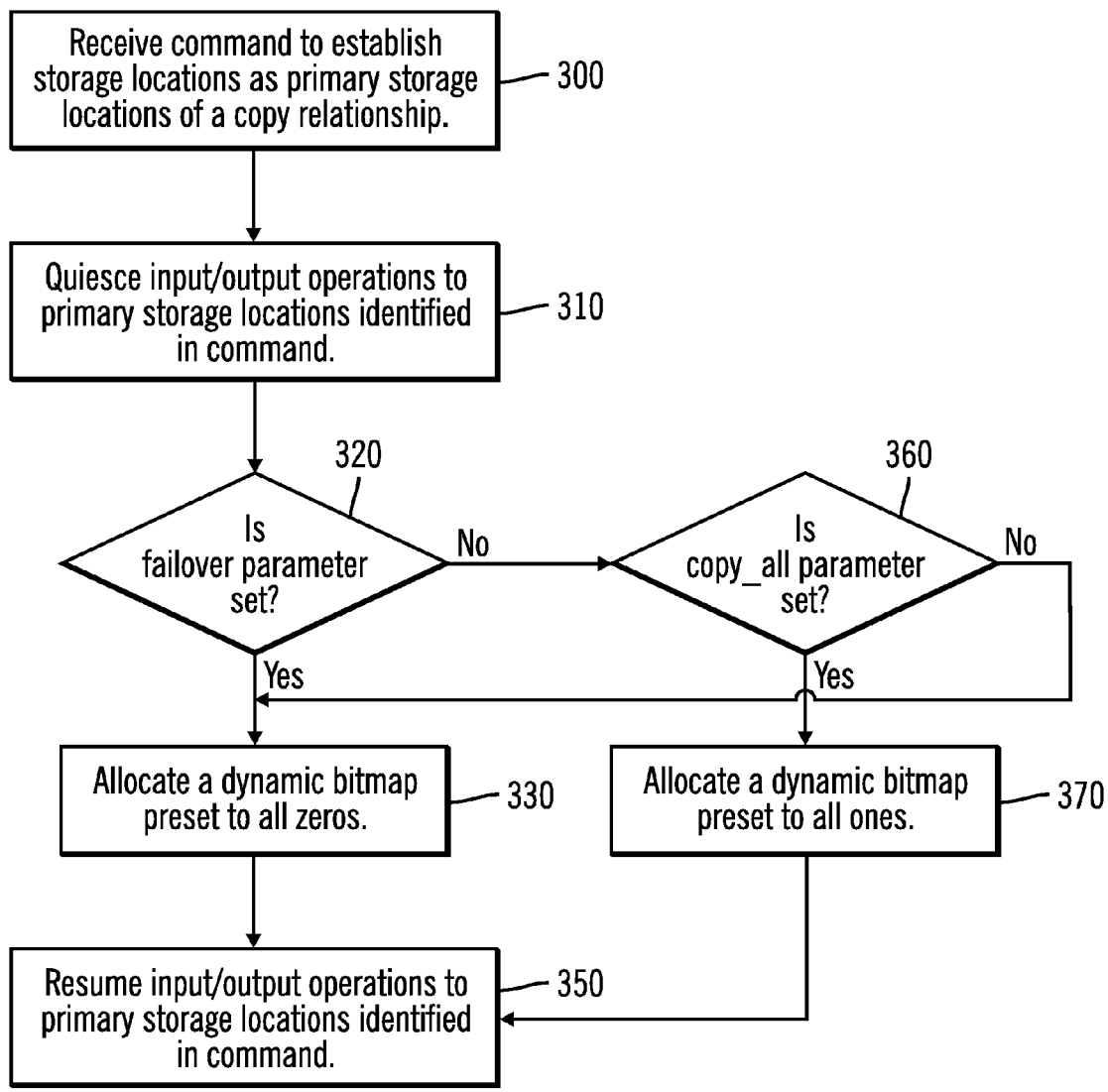
FIG. 5 illustrates an embodiment of more detailed operations to select a dynamically assignable bitmap which has been preset to one of a plurality of different predetermined bit patterns, for use as an out-of-sync bitmap for a mirror or other copy relationship being established.

FIG. 5 shows one example of operations for assigning a dynamic bitmap for an OOS function in which the dynamic bitmap has been preset in one of a plurality of different bit pattern presets. In one operation, a command is received (block 300) to establish one or more storage locations as primary storage locations of a copy relationship. Such a command may be received in connection with a swap operation initiated in response to detection of a failure event at the local site, for example, as discussed above. In such a swap operation, the secondary storage locations such as the secondary storage 6b (FIG. 1) at the remote site are "swapped" to become primary storage locations of a now primary storage 6b (FIG. 3) of a new copy relationship, such as the second copy relationship 30b (FIG. 3).

Alternatively, a command to establish storage locations as primary storage locations of a copy relationship may be received in other instances such as when network storage copy relationships are being initiated prior to any subsequent failures. Thus, a command to establish the storage locations of storage 6a (FIG. 1) as primary storage locations of the copy relationship 30a, may be received when the copy relationship 30a was initially being established. The input/output operations to the primary storage locations identified in the establish command are quiesced (block 310) to prepare for the OOS bitmap assignment.

In copy service programs such as PPRC programs, an establish command typically has a number of parameters which may be set including a failover parameter and a "copy all" parameter. If the failover parameter is set, the primary storage locations being established by the establish command are the former secondary storage locations and the failover target of a failover operation which was initiated in response to detection of a failure event of the original primary storage locations. Since mirroring or other copying operations were ongoing prior to detection of the failure event, the new primary storage locations (which were the original secondary storage locations prior to failover) and the new secondary storage locations after failback (which were the original storage locations prior to failover) may require relatively little resynchronization. Hence, if the failover parameter of the establish command is set (block 320), it may be appropriate to allocate a dynamic bitmap which has been preset to all zeros (block 330) since relatively few one bits may be needed to mark bitmaps positions representing tracks which should be copied back to the secondary storage locations, to resynchronize the storage locations of the local and remote sites as input/output operations to the primary storage locations identified in the establish command are resumed (block 350).

FIG. 4b shows the metadata chart 200 updated to indicate that a dynamic bitmap preset to all zeros has an index value BI_02, for example, has been allocated to the out-of-sync (OOS) function. Because the dynamic bitmap BI_02 allocated to the OOS function is preset to all zeros, staging operations are not needed to mark the bitmap positions representing tracks which are not to be copied back to the secondary storage locations. Instead, relatively few staging operations may be needed to mark the relatively few additional bitmap positions representing tracks which should be copied back to the secondary storage locations. As a result, staging operations to update the dynamic bitmap allocated to the OOS function may be reduced in some applications.

Conversely, if the "copy all" parameter is set (block 360), all tracks of the primary storage locations being established by the establish command are to be copied to the secondary storage locations being established by the establish command. In the illustrated embodiment, since a one in a bit position in the OOS bitmap indicates that the track represented by that bit position is to be copied, and since all tracks of the primary storage locations are to be copied, it may be appropriate to allocate a dynamic bitmap which has been preset to all ones (block 370) since relatively few zeros may be needed to mark bitmaps positions representing tracks which should not be copied back to the secondary storage locations to resynchronize the storage locations of the local and remote sites as input/output operations to the primary storage locations identified in the establish command are resumed (block 350).

FIG. 4c shows an example of the metadata chart 200 which has been updated to indicate that a dynamic bitmap preset to all ones and having an index value BI_04, for example, has been allocated to the out-of-sync (OOS) function. Because the dynamic bitmap BI_04 allocated to the OOS function is preset to all ones, relatively few staging operations may be needed to mark bitmaps positions representing tracks which should not be copied back to the secondary storage locations. As a result, staging operations to update the dynamic bitmap allocated to the OOS function may be reduced in some applications.

In the embodiment of FIG. 5, if neither the failover nor the copy all parameter has been set (blocks 320, 360), the default operation is to allocate (block 330) a dynamic bitmap preset to all zeros. Thereafter input/output operations are resumed (block 350). In the event that bitmaps are available but that the available bitmaps are not of the requested type, an available bitmap may be initialized to have the requested bit pattern and assigned to the requesting function. Also a bitmap of the requested type may not be available because it has been previously used and remains "dirty." In such cases, the bitmap may be "cleaned" so that the bit pattern is reset to the requested type. In the event that all bitmaps are in use and are not available, the request for a bitmap is rejected until a bitmap becomes available.

Figure 6:
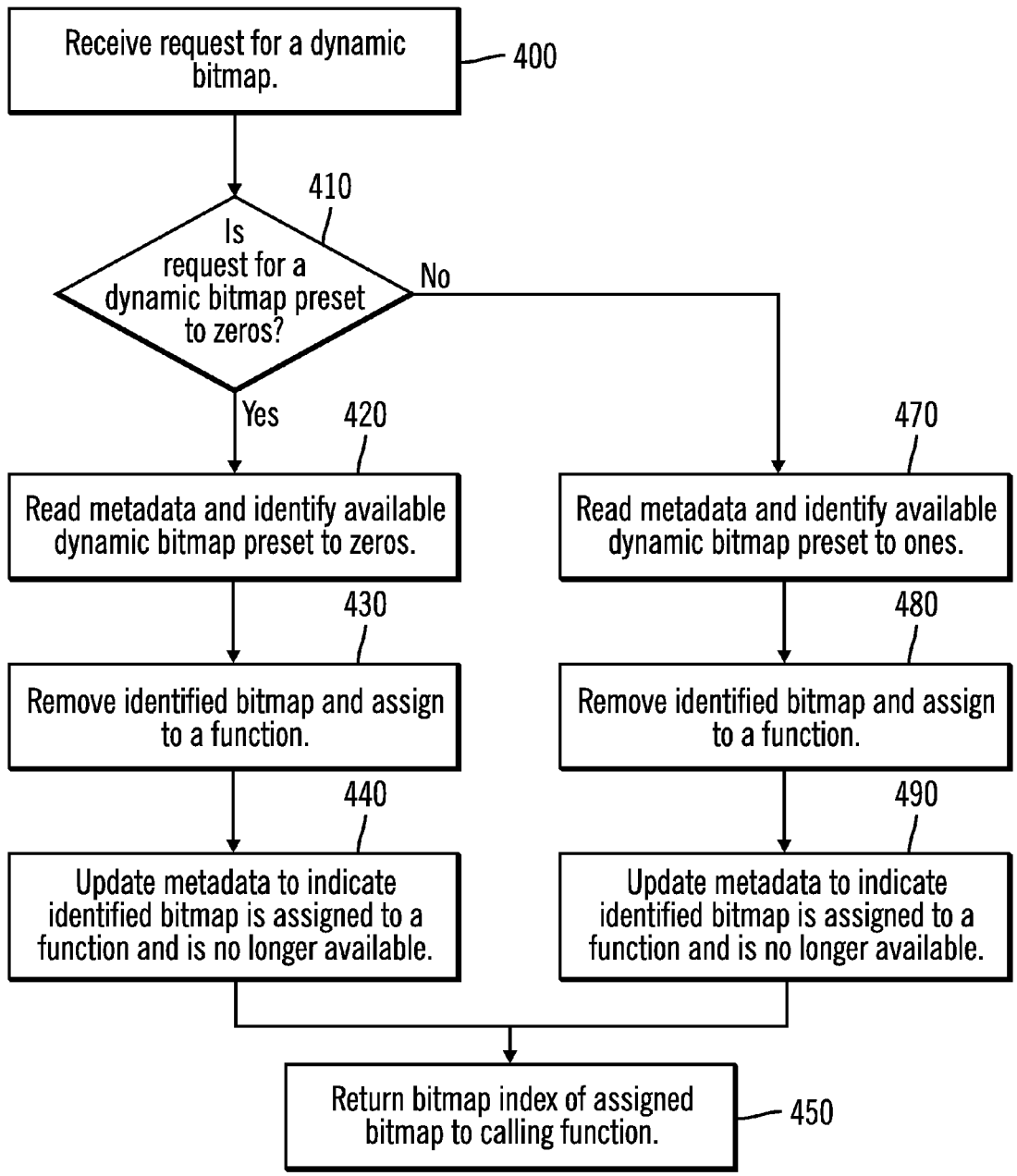
FIG. 6 illustrates an embodiment of more detailed operations to select a dynamically assignable bitmap which has been preset to one of a plurality of different predetermined bit patterns.

FIG. 6 shows an example of operations depicting some aspects of the dynamic bitmap allocation operations 330 and 370 of FIG. 5 in greater detail. However, FIG. 5 is directed to dynamic bitmap allocation in connection with an establish command or operation. It is appreciated that dynamic bitmaps having different preset bit patterns may be requested in connection with other operations and commands.

Accordingly, in the embodiment depicted in FIG. 6, a request is received (block 400) for a dynamic bitmap. A determination (block 410) is made as to whether the request is for a dynamic bitmap which has been preset to zeros. In the embodiment of FIG. 5, the determination is made by examining a parameter of an establish command. It is appreciated herein that copy services may request a dynamic bitmap in other circumstances, depending upon the particular application.

If the request is determined to be a request for a bitmap preset to zeros, metadata such as that depicted in FIG. 4a, for example, is read (block 420) to identify available dynamic bitmaps which have been preset to zeros. In the example of FIG. 4a, it is seen that dynamic bitmaps having bitmap index values of BI_02 and BI_14 have been preset to all zeros and both have not been assigned to a function and therefore both are available for allocation in response to a request. Hence, one of the dynamic bitmaps, BI_02, BI_14, may be removed (block 430) from the list of available dynamic bitmaps and assigned to a function in response to the request. The metadata may be updated (block 440) to indicate that the identified bitmap is assigned to a function and is therefore no longer available. For example, in the embodiment of FIG. 4b, the dynamic bitmap having bitmap index value of BI_02 is indicated as assigned to the OOS function, for example, and is therefore no longer available for allocation.

The bitmap index value of the dynamic bitmap being assigned may be returned (block 450) to the calling function. For example, in the embodiment of FIG. 4b, the bitmap index value of BI_02 may be returned to the OOS function of the establish operation in connection with the establish command. Hence, the OOS function may utilize the dynamic bitmap BI_02 which has been preset to zeros for the OOS function. Once the function that requested the bitmap is no longer using the bitmap, the dynamic bitmap may be added back to the metadata list of available bitmaps. Hence, the dynamic bitmap having bitmap index value of BI_02 may be indicated as available for allocation as indicated in the chart 200 of FIG. 4a. The bitmap may be cleaned and restored to the original preset bit pattern (all zeros, for example) as indicated in FIG. 4a. The cleaning operation may be performed in background, for example, in anticipation of the next request for a bitmap preset to all zeros. Alternatively, the bitmap may be preset to a different bit pattern in anticipation of the next request. In other applications, the bitmap may be initialized upon receipt of a request for a bitmap if the bitmap has not already been cleaned or if the bit pattern is not of the requested type and no bitmaps having the requested type are available.

In this embodiment, the dynamic bitmaps are preset with one of two different preset bit patterns, either all ones or all zeros. It is appreciated that dynamic bitmaps may be preset with bit patterns other than all zeros or all ones. In this embodiment, if the determination (block 410) is made that the request is not a request for a dynamic bitmap which has been preset to zeros, it is determined that the request is for a dynamic bitmap which has been preset to ones since, in this embodiment, the dynamic bitmaps are preset with either all ones or all zeros. If so, metadata such as that depicted in FIG. 4a, for example, is read (block 470) to identify available dynamic bitmaps which have been preset to ones. In the example of FIG. 4a, it is seen that dynamic bitmaps having bitmap index values of BI_04 and BI_16 have been preset to all ones and both have not been assigned to a function and therefore both are available for allocation in response to a request. Hence, one of the dynamic bitmaps, BI_04, BI_16, may be removed (block 480) from the list of available dynamic bitmaps and assigned to a function in response to the request. The metadata may be updated (block 490) to indicate that the identified bitmap is assigned to a function and is therefore no longer available. For example, in the embodiment of FIG. 4c, the dynamic bitmap having bitmap index value of BI_04 is indicated as assigned to the OOS function, for example, and is therefore no longer available for allocation.

The bitmap index value of the dynamic bitmap being assigned may be returned (block 450) to the calling function. For example, in the embodiment of FIG. 4c, the bitmap index value of BI_04 may be returned to the OOS function of the establish operation in connection with the establish command. Hence, the OOS function may utilize the dynamic bitmap BI_04 which has been preset to ones for the OOS function. Again, once the function that requested the bitmap is no longer using the bitmap, the dynamic bitmap may be cleaned or initialized as appropriate and added back to the metadata list of available bitmaps.

In one aspect of the present description, it is believed that selecting a dynamically assignable bitmap preset to one of a plurality of different predetermined bit patterns for use as an out-of-sync bitmap can significantly reduce processing time for failover command processing in a recovery application. Furthermore, it is believed that selecting a dynamically assignable bitmap preset to one of a plurality of different predetermined bit patterns for use as an out-of-sync bitmap can significantly reduce processing time for initial copy relationship establish command processing in a copy program. For example, by using dynamic bitmaps for OOS bitmaps, initialization of the OOS bitmap may be reduced or eliminated during command processing time.

Moreover, it is believed that, in many applications, failover or establish command processing time may not increase for larger volumes or slower ranks or slower drives. As a result, by decreasing command processing time, overall outage time during a swapping event such as a HyperSwap event, for example may be reduced as well.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
   establishing a copy relationship between a storage location at a first site and a storage location at a second site in a data storage system, wherein said establishing includes:
   selecting a dynamically assignable bitmap preset to one of a plurality of different predetermined bit patterns as a function of both the availability of the selected bitmap and the type of predetermined bit pattern identified for the selected bitmap;
   assigning the selected bitmap as an out-of-sync bitmap wherein updates to the storage location at the second site, which are to be copied to the storage location at the first site, are indicated in the selected bitmap;
   copying data writes being written to the storage location at one site, to the storage location at the other site, using the selected bitmap as an out-of-sync bitmap; and
   receiving an establish command wherein said copy relationship establishing is in response to said establish command;
   wherein the bitmap selecting includes:
   determining if a failover parameter has been set in the received establish command;
   selecting a dynamically assignable bitmap preset to a first predetermined bit pattern if it is determined that a failover parameter has been set in the received establish command;
   determining if a copy all parameter has been set in the received establish command; and
   selecting a dynamically assignable bitmap preset to a second predetermined bit pattern different from the first predetermined bit pattern, if it is determined that a copy all parameter has been set in the received establish command.

2. The method of claim 1 further comprising detecting a failure event at one of the first and second sites, wherein said copy relationship establishing is in response to said failure detection.

3. The method of claim 2 wherein said copy relationship is a mirror relationship, and wherein storage locations at said first and second sites are initially in a first mirror relationship in which the storage location of the first mirror relationship at the first site is a primary storage location of the first mirror relationship, and the storage location of the first mirror relationship at the second site is the secondary storage location of the first mirror relationship, wherein in the first mirror relationship, updates to the primary storage location at the first site are mirrored to the secondary storage location at the second site, and wherein said mirror relationship establishing is in response to said failure detection, and includes swapping the primary and secondary storage location designations of the first and second sites to a second mirror relationship in which the storage location of the second mirror relationship at the second site is a primary storage location of the second mirror relationship, and the storage location of the second mirror relationship at the first site is the secondary storage location of the second mirror relationship, wherein in the second mirror relationship, updates to the primary storage location at the second site are mirrored to the secondary storage location at the first site.

4. The method of claim 1 wherein the first predetermined bit pattern is all zeros and the second predetermined bit pattern is all ones.

5. The method of claim 4 wherein a position of a bit pattern of the bitmap represents a portion of the storage location of the copy relationship at the one site and a value of the bit pattern position indicates whether data stored at the storage location portion represented by the bit pattern position is to be copied to a corresponding portion of the storage location of the copy relationship at the other site.

6. The method of claim 1 wherein the selecting a dynamically assignable bitmap preset to a predetermined bit pattern, includes reading a data structure identifying a plurality of dynamically assignable bitmaps available to be assigned and identifying the type of predetermined bit pattern of each of the plurality of available dynamically assignable bitmaps, and selecting a dynamically assignable bitmap as a function of both the availability of the selected bitmap as identified by the data structure and the type of predetermined bit pattern as identified by the data structure.

7. The method of claim 6 wherein the assigning the selected bitmap as an out-of-sync bitmap includes updating the data structure to indicate that the selected bitmap is in use and is therefore no longer available.

8. The method of claim 1 wherein the assigning the selected bitmap as an out-of-sync bitmap includes updating a data structure to indicate that the selected bitmap has been assigned as an out-of-sync bitmap.

9. The method of claim 1 further comprising:
receiving an establish command wherein said copy relationship establishing is in response to receipt of said establish command, and wherein the selecting a dynamically assignable bitmap preset to a predetermined bit pattern, is a function of a parameter of the received establish command.

* * * * *